US008000995B2

(12) United States Patent
Chu et al.

(10) Patent No.: US 8,000,995 B2
(45) Date of Patent: Aug. 16, 2011

(54) SYSTEM AND METHOD FOR ASSESSING CUSTOMER SEGMENTATION STRATEGIES

(75) Inventors: Chengwen R. Chu, Cary, NC (US); Jack T. Bulkley, Apex, NC (US)

(73) Assignee: SAS Institute Inc., Cary, NC (US)

( * ) Notice: Subject to any disclaimer, the term of this patent is extended or adjusted under 35 U.S.C. 154(b) by 1355 days.

(21) Appl. No.: 11/386,918

(22) Filed: Mar. 22, 2006

(65) Prior Publication Data
US 2007/0226039 A1 Sep. 27, 2007

(51) Int. Cl.
*G06Q 30/00* (2006.01)
(52) U.S. Cl. .................................................... 705/7.33
(58) Field of Classification Search ................. 705/7.33
See application file for complete search history.

(56) References Cited

U.S. PATENT DOCUMENTS

| | | | |
|---|---|---|---|
| 6,026,397 A | 2/2000 | Sheppard | |
| 6,088,676 A * | 7/2000 | White, Jr. | 705/7 |
| 6,269,325 B1 | 7/2001 | Lee et al. | |
| 6,317,752 B1 * | 11/2001 | Lee et al. | 707/748 |
| 6,430,539 B1 | 8/2002 | Lazarus et al. | |
| 6,542,894 B1 | 4/2003 | Lee et al. | |
| 6,839,682 B1 | 1/2005 | Blume et al. | |
| 7,035,811 B2 * | 4/2006 | Gorenstein | 705/10 |
| 7,047,251 B2 | 5/2006 | Reed et al. | |
| 7,398,270 B1 * | 7/2008 | Choi et al. | 1/1 |
| 7,756,804 B2 * | 7/2010 | Bloom et al. | 706/46 |
| 2003/0018601 A1 | 1/2003 | Lee et al. | |
| 2003/0083924 A1 | 5/2003 | Lee et al. | |
| 2003/0110119 A1 | 6/2003 | Crites | |
| 2003/0176931 A1 * | 9/2003 | Pednault et al. | 700/31 |
| 2003/0187717 A1 | 10/2003 | Crites et al. | |
| 2003/0187767 A1 | 10/2003 | Crites et al. | |
| 2003/0200134 A1 * | 10/2003 | Leonard et al. | 705/10 |
| 2005/0010477 A1 * | 1/2005 | Sullivan et al. | 705/14 |
| 2005/0240468 A1 * | 10/2005 | Inman et al. | 705/10 |

OTHER PUBLICATIONS

SAS Institute Inc. Getting Started with SAS Enterprise Miner 4.3, Jan. 2004, ISBN 1-59047-231-4, selected pages.*
SAS Institute Inc. What's New in SAS® Enterprise Miner 5.2, Nov. 2005.*
Corinne Baragoin et al. Enhance Your Business Applications: Simple Integration of Advanced Data Mining Functions. (abridged by deletion of the appendixes to minimize pages) International Business Machines Corporation. Dec. 2002. ISBN 0738427799.*
Cabena, Peter et al., Intelligent Miner for Data Applications Guide, IBM, Redbook, SG24-5252-00, Mar. 1999.*
C. C Apte et al. "Segmentation-Based Modeling for Advanced Targeted Marketing," IBM Research Report, RC 21982 (98791) Mar. 8, 2001.*

(Continued)

*Primary Examiner* — Scott L Jarrett
*Assistant Examiner* — George H Walker
(74) *Attorney, Agent, or Firm* — Jones Day

(57) ABSTRACT

In a novel computer-implemented method and system for assessing segmentation strategies, at least two models are selected for a plurality of segments. Segment performance of the segmentation strategy segments according to selected models is measured. Aggregate segmentation strategy performance data is obtained by aggregating segment performance for each segmentation strategy. Segmentation strategy performance indicia are generated to compare the aggregate segmentation strategy performance data of at least two of the segmentation strategies.

12 Claims, 11 Drawing Sheets

OTHER PUBLICATIONS

Alexander Berry, III. Using market segmentation for corporate customers, Commercial Lending Review; Summer 1995; vol. 10, No. 3; p. 36.*

YongSeog Kim, W. Nick Street, An intelligent system for customer targeting: a data mining approach, Decision Support Systems, vol. 37, Issue 2, May 2004, pp. 215-228, ISSN 0167-9236, DOI: 10.1016/S0167-9236(03)00008-3. (http://www.sciencedirect.com/science/article/pii/S0167923603000083).*

Paul E. Green, Frank J. Carmone. "Segment Congruence Analysis: A Method for Analyzing Association Among Alternative Bases for Market Segmentation" The Journal of Consumer Research vol. 3, No. 4 (Mar. 1977), pp. 217-222 Published by: The University of Chicago Press Stable URL: http://www.jstor.org/stable/2489607.*

Suzanne Goller, Annik Hogg, and Stavros P Kalafatis. "A new research agenda for business segmentation." European Journal of Marketing 36, no. 1/2 (Jan. 1, 2002): 252-271. http://www.proquest.com/ (accessed May 25, 2011).*

Mike Peterman, and Holly Paulus. "Treasure hunting." Target Marketing May 1, 2001: ABI/INFORM Global, ProQuest. Web. Jun. 7, 2011.*

Chauchat J. H., Rakotomalala R., Carloz M., Pelletier C. "Targeting customer groups using gain and cost matrix: a marketing application," Proc. Of Data Mining for Marketing Applications Workshop, PKDD'2001, pp. 1-13,2001. { http://citeseerx.ist.psu.edu/viewdoc/summary?doi=10.1.1.144.2988}.*

SAS Institute Inc., "Finding the Solution to Data Mining: Exploring the Features and Components of Enterprise Miner", Release 4.1, 32 pp. (2001).

SAS Institute Inc., "Applying Data Mining Techniques Using Enterprise Miner Course Notes", book code 58801, course code ADMT, 308 pp. (Apr. 5, 2002).

SAS Institute Inc., "SAS® Enterprise Miner 5.2", Fact Sheet, 8 pp. (2005).

SAS Institute Inc., "Getting Started with SAS® Enterprise Miner 5.2", 153 pp. (2006).

* cited by examiner

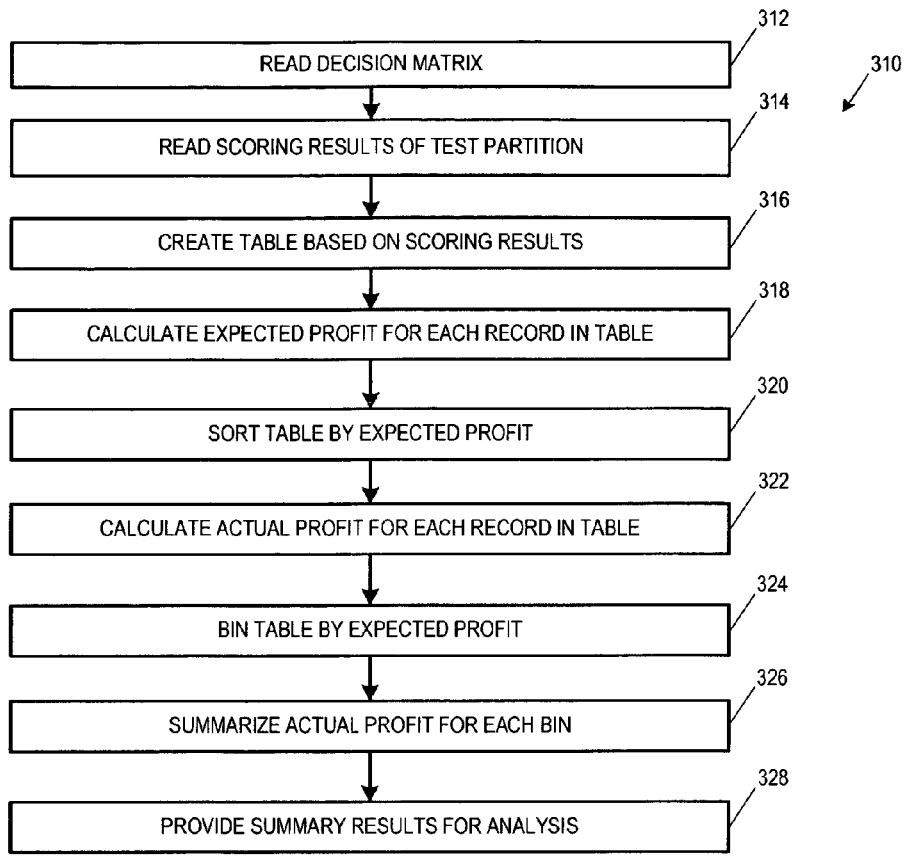

SYSTEM AND METHOD FOR ASSESSING CUSTOMER SEGMENTATION STRATEGIES

BACKGROUND AND SUMMARY

This disclosure generally relates to data mining, and particularly relates to assessing multiple segmentation strategies for use in data mining.

A segmentation strategy partitions a population into several segments to achieve a better return on a decision making investment. In general, a segmentation strategy divides a heterogeneous group into homogenous subgroups, such as male and female groups, or other groups based on similar profiles, lifestyles, behavior, etc. Models are used for each segment of the segmentation strategy to predict a response, such as a response to a marketing activity. Predictive models may be designed for and trained for a given segment.

There are, however, many competing segmentation strategies as a large population may be segmented in numerous subgroups. For example, a segmentation strategy may be based on one or more of the following characteristics—gender, religion, income, ethnicity, etc. It is difficult to quantify and/or compare the performance of multiple segmentation strategies and determine which segmentation strategy offers the best performance.

A novel computer-implemented method and system for assessing segmentation strategies is disclosed herein. At least two models are selected for a plurality of segments. Segment performance of the segmentation strategy segments according to selected models is measured. Aggregate segmentation strategy performance data is obtained by aggregating segment performance for each segmentation strategy. Segmentation strategy performance indicia are generated to compare the aggregate segmentation strategy performance data of at least two of the segmentation strategies.

DRAWINGS

FIG. 13 is a flow diagram of an example process of integrating a decision matrix;

FIG. 14 is a table detailing an example multiple criteria, multiple segmentation strategy assessment table;

DETAILED DESCRIPTION

Figure 1:
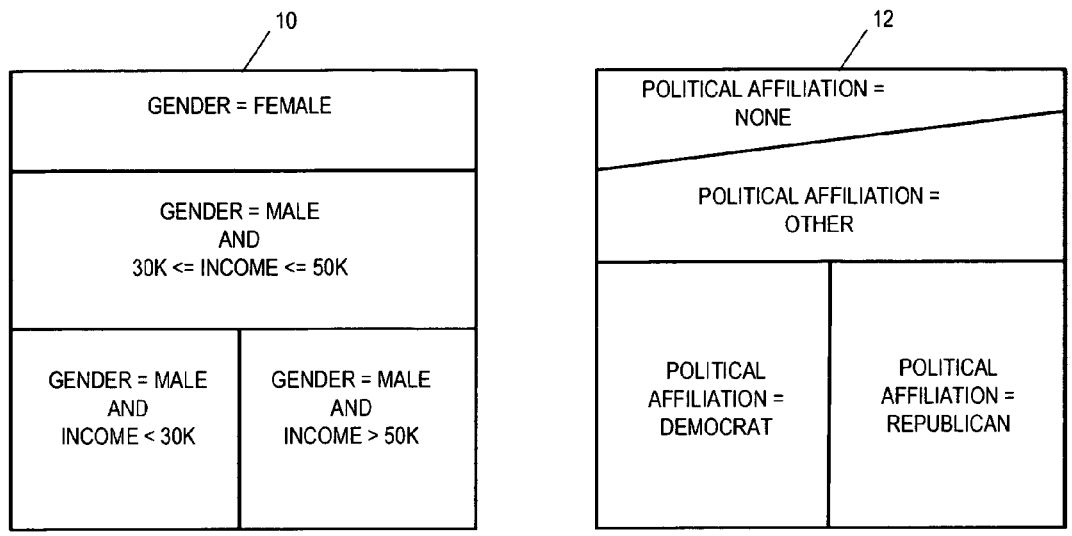
FIG. 1 is a block diagram illustrating multiple segmentation strategies.

FIG. 1 is a block diagram illustrating multiple segmentation strategies. A first segmentation strategy 10 defines segments based on gender, and further defines male segments based on income. A second segmentation strategy 12 defines segments based on political affiliation. The first and second segmentation strategies 10 and 12 may be applied to the same population, such as a client list stored in a data store. Given that a heterogeneous group may have multiple homogenous subgroups, such as gender, age, income, religion, client tenure, etc., numerous segmentation strategies may be applied to a population.

A response for each segment of a segmentation strategy may be predicted by a model. For example, models may be used to predict responses to directed advertisements, loyalty to a brand, account acquisitions, or to detect fraudulent activity. The models may be implemented by a variety of modeling methods, such as univariate models, $Chi^2$ automatic interaction detection (CHAID), classification and regression trees (CART), multivariate analysis regression, neural networks, and the like.

Figure 2:
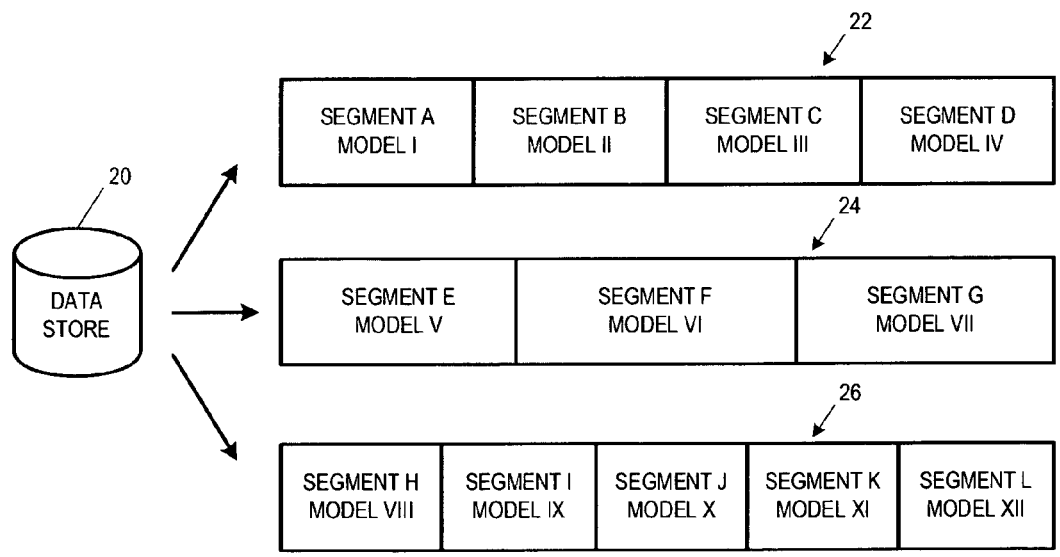
FIG. 2 is a block diagram illustrating multiple segmentation strategies in which multiple models are used for the segments of the segmentation strategies.

FIG. 2 is a block diagram illustrating multiple segmentation strategies in which multiple models are used for the segments of the segmentation strategies. A data store 20 stores a population, such as a database of client or customer information. A first segmentation strategy 22 defines segments A-D associated with models I-IV, respectively. A second segmentation strategy 24 defines segments E-G associated with models V-VII, respectively. A third segmentation strategy 26 defines segments H-L associated with models VIII-XII, respectively.

Each segmentation strategy defines a plurality of segments as shown in FIG. 2. Typically, a champion model is selected for each segment. However, it is difficult to quantify and/or compare the performance of multiple segmentation strategies to determine which segmentation strategy offers the best performance.

Figure 3:
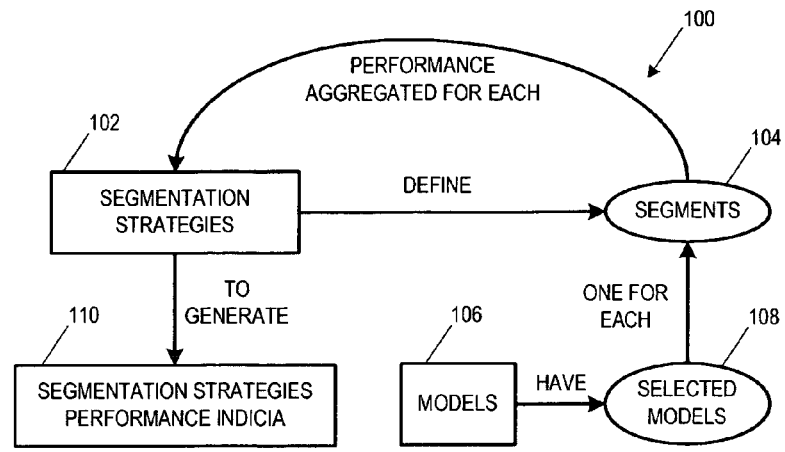
FIG. 3 is a block diagram illustrating components of a segmentation strategy assessment utility.

FIG. 3 is a block diagram illustrating components of a segmentation strategy assessment utility 100. A plurality of segmentation strategies 102 define a plurality of segments 104. Performance for the segments 104 according to the models 106 may be measured. In particular, selected models 108 are selected from the models 106 so that there is a selected model for each of the segments 104. The selected models 108 define at least two of the models 106. Segment performance for each segment 104 according to its selected model 108 is measured, and segment performance for each segmentation strategy 102 is aggregated to obtain segmentation strategy performance data. The segmentation strategy performance data, in turn, is used to generate segmentation strategy performance indicia that compare the aggregate segmentation strategy performance data of at least two of the segmentation strategies 102.

Figure 4:
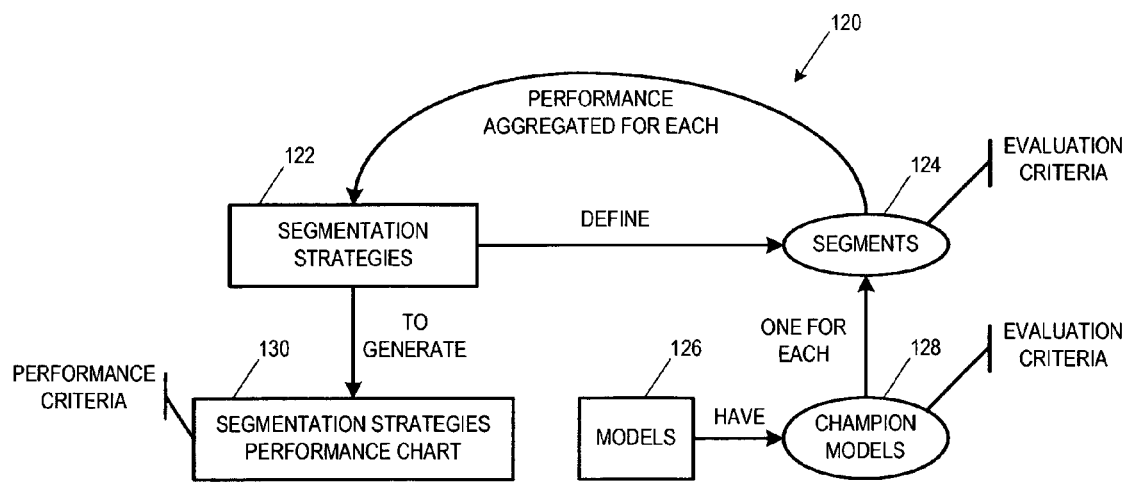
FIG. 4 is a block diagram of another embodiment of the segmentation strategy assessment utility.

FIG. 4 is a block diagram of another embodiment of a segmentation strategy assessment utility 120. A plurality of segmentation strategies 122 define a plurality of segments 124. Performance of each of the segments 124 may be predicted by models 126. Champion models 128 are determined from the models 126 so that there is a champion model for each of the segments 124. The champion models 128 define at least two of the models 126. The champion models 128 are determined by evaluation criteria, such as a top lift percentage, top profit percentage, misclassification criteria, or other model evaluation criteria. Multiple models 126 may be run against a segment 124 to identify a champion model 128.

Segment performance for each segment 124 according to its champion model 128 is measured, and segment performance for each segmentation strategy 122 is aggregated to obtain segmentation strategy performance data. The segmentation strategy performance data may be evaluated against performance criteria to determine if the performance of the segmentation strategy 122 is acceptable. In one embodiment, the performance criteria may include lift over a baseline. In another embodiment, the performance criteria may include lift relative to an existing segmentation strategy utilized. Non-strategy related settings for a segmentation strategy 122, such as data partitioning, may be adjusted if the segmentation strategy performance data does not meet the performance criteria. The segmentation strategy performance data, in turn, is used to generate a segmentation strategies performance chart 130 that compares the aggregate segmentation strategy performance data of at least two of the segmentation strategies 122. The segmentation strategies performance chart 130 may be used to evaluate the segmentation strategies performance data against performance criteria, such as top profit percentage, a top lift percentage, or a performance of a particular segmentation strategy relative to other segmentation strategies 122.

In one embodiment, performance for the segments according to a particular model may be measured by first generating a score code, e.g., a rule set or logic set for the model. The model is then applied to the segment to score the segment and generate an output variable, e.g., probabilities for the records of the segment. The output variable is then assessed according to evaluation criteria. Other measurement methods may also be used.

Figure 5:
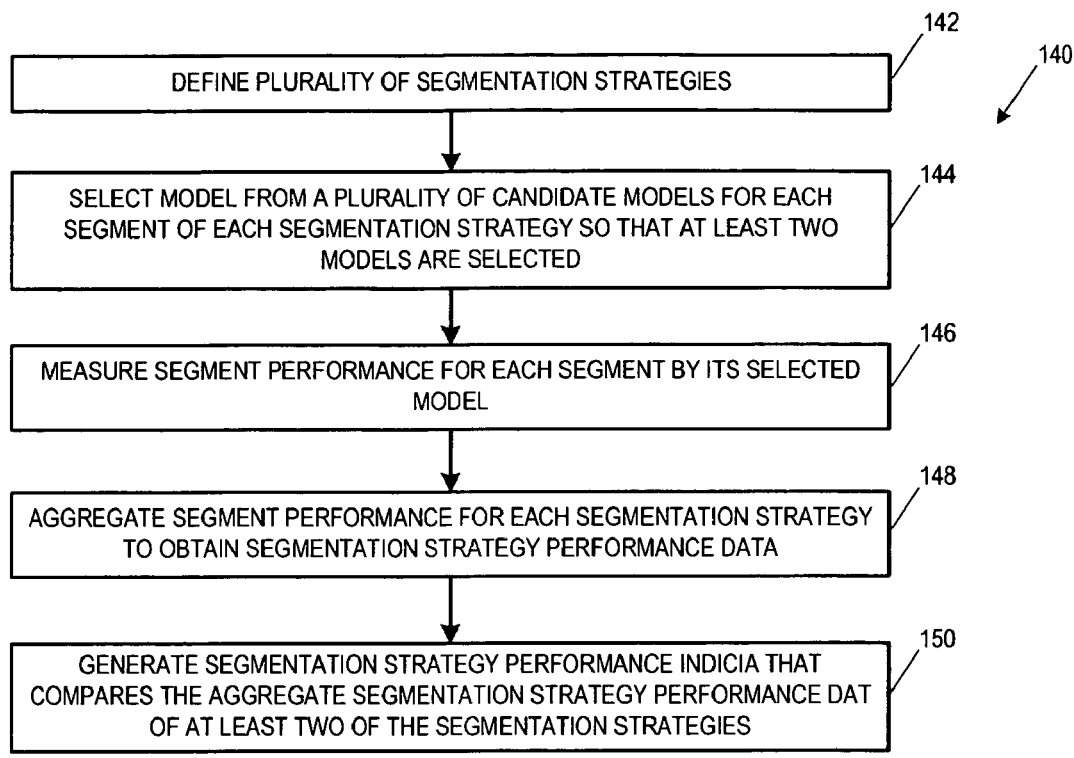
FIG. 5 is a flow diagram of a process of assessing segmentation strategies.

FIG. 5 is a flow diagram 140 of a process of assessing segmentation strategies. Step 142 defines a plurality of segmentation strategies. Each of the segmentation strategies includes a plurality of segments. One example process for defining a segmentation strategy includes the identification of classification variables of a population. The classification variables may be financial, demographic, geographic, behavioral, or other variables that may be used to classify a population. The classification variables are used to group the population into segments so that the segments may be dealt with rather than dealing with individuals of the population.

Step 144 selects a model from a plurality of candidate models for each segment of each segmentation strategy so that at least two models are selected. A variety of models may be used for candidate models, including CHAID, CART, multivariate analysis regression, neural networks, and the like.

Step 146 measures segment performance for each segment by its selected model. Multiple models may be used for each segment so that the segment may be iteratively modeled to identify a model having the best performance for a segment.

Step 148 aggregates segment performance for each segmentation strategy to obtain aggregate segmentation performance data for each segmentation strategy. Step 150 generates segmentation strategy performance indicia that compare the aggregate segmentation strategy performance data of at least two of the segmentation strategies. Examples of segmentation strategy performance indicia include textual indicia, graphical indicia, and numerical indicia.

Figure 6:
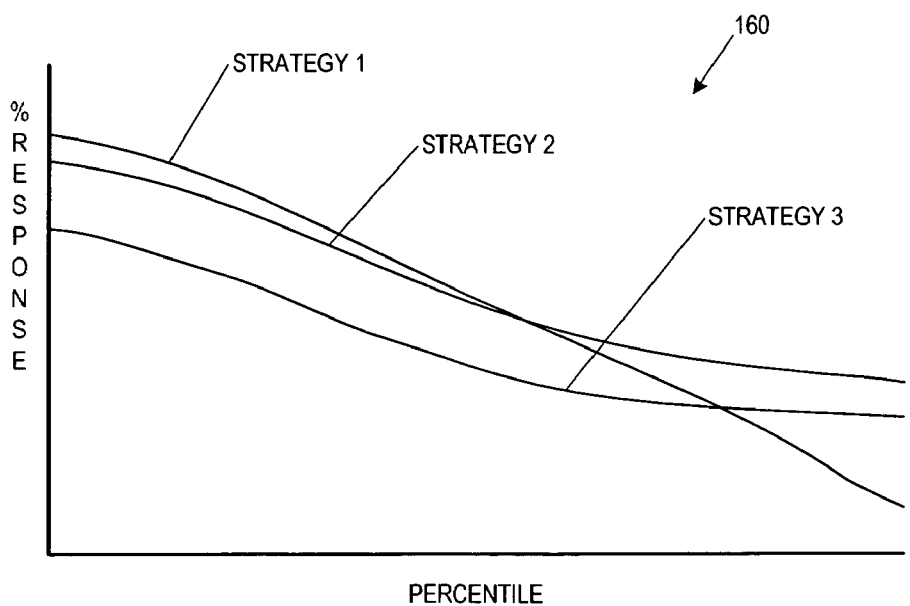
FIG. 6 is an example graphical data display of segmentation strategy performance indicia.

FIG. 6 is an example graphical data display 160 of segmentation strategy performance indicia. Each response curve in the graphical data display 160 corresponds to the aggregate segmentation strategy performance data for each segmentation strategy. In one embodiment, the aggregate segmentation strategy performance data corresponds to a lift curve that represents the cumulative percentage of captured responses.

In a different embodiment, the aggregate segmentation strategy performance data corresponds to a lift relative to an existing segmentation strategy that may currently be utilized by a user. Determining the lift relative to an existing segmentation strategy facilitates evaluation of the performance of a plurality of candidate segmentation strategies relative to the existing segmentation strategy and relative to other candidate segmentation strategies. For example, if a company has been utilizing a segmentation strategy based on gender and income, the performance of other segmentation strategies may be compared relative to the existing segmentation strategy.

Figure 7:
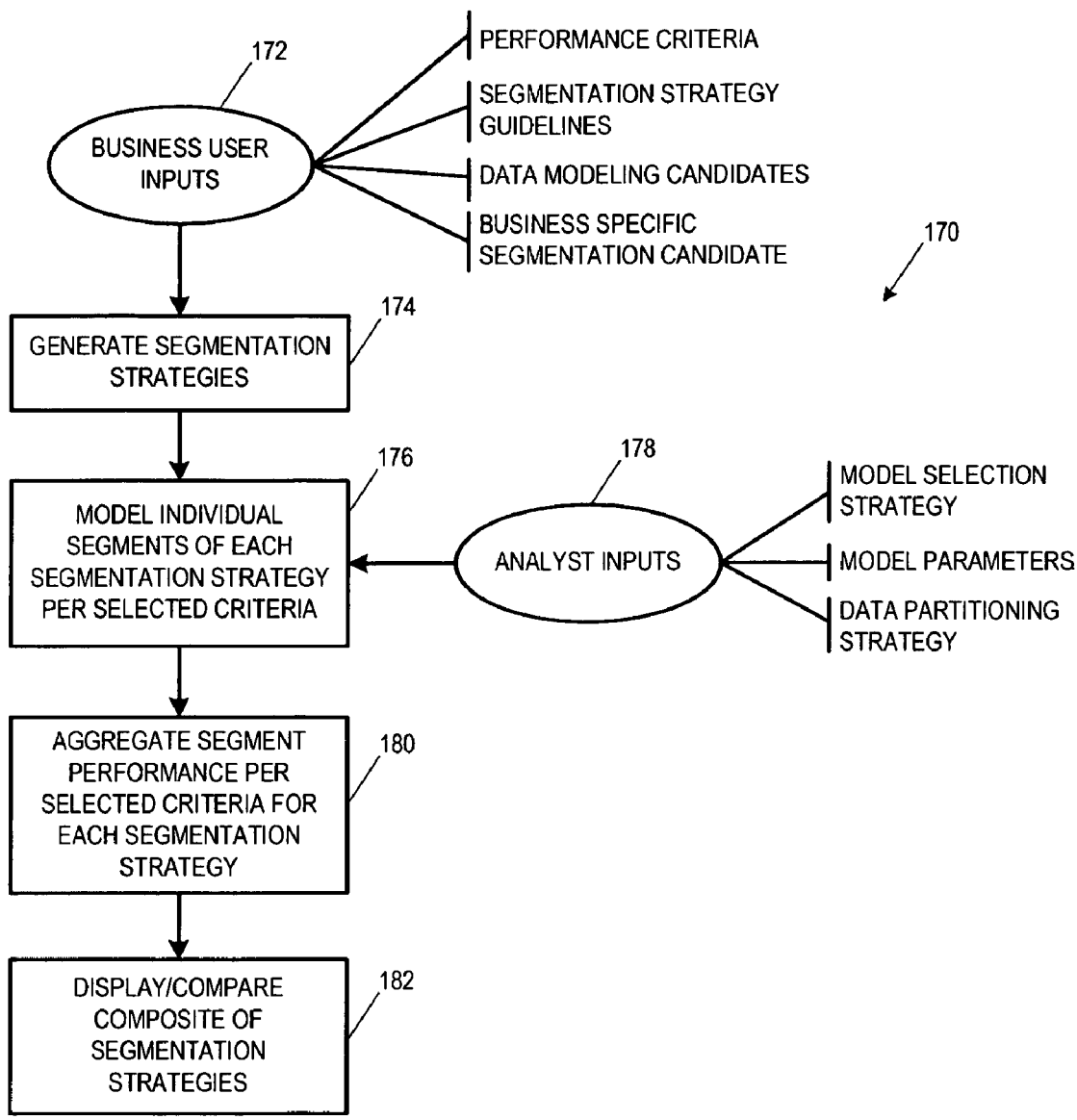
FIG. 7 is a flow diagram of another embodiment of the process for assessing segmentation strategies.

FIG. 7 is a flow diagram 170 of another embodiment of the process for assessing segmentation strategies. The business user inputs 172 provide source criteria for evaluating segmentation strategies. Example business user inputs 172 include performance criteria, segmentation strategy guidelines, data modeling candidates, and business specific segmentation candidates. Step 174 generates segmentation strategies based on the business user inputs 172.

Step 176 models individual segments of each segmentation strategy per selected criteria. Criteria may be selected by analyst inputs 178, examples of which include model selection strategy, model parameters, and data partitioning strategy.

Step 180 aggregates segment performance per the selected criteria for each segmentation strategy. Step 182 displays composites of the segmentation strategy performance based on the aggregate segmentation strategy performance per the selected criteria.

Figure 8:
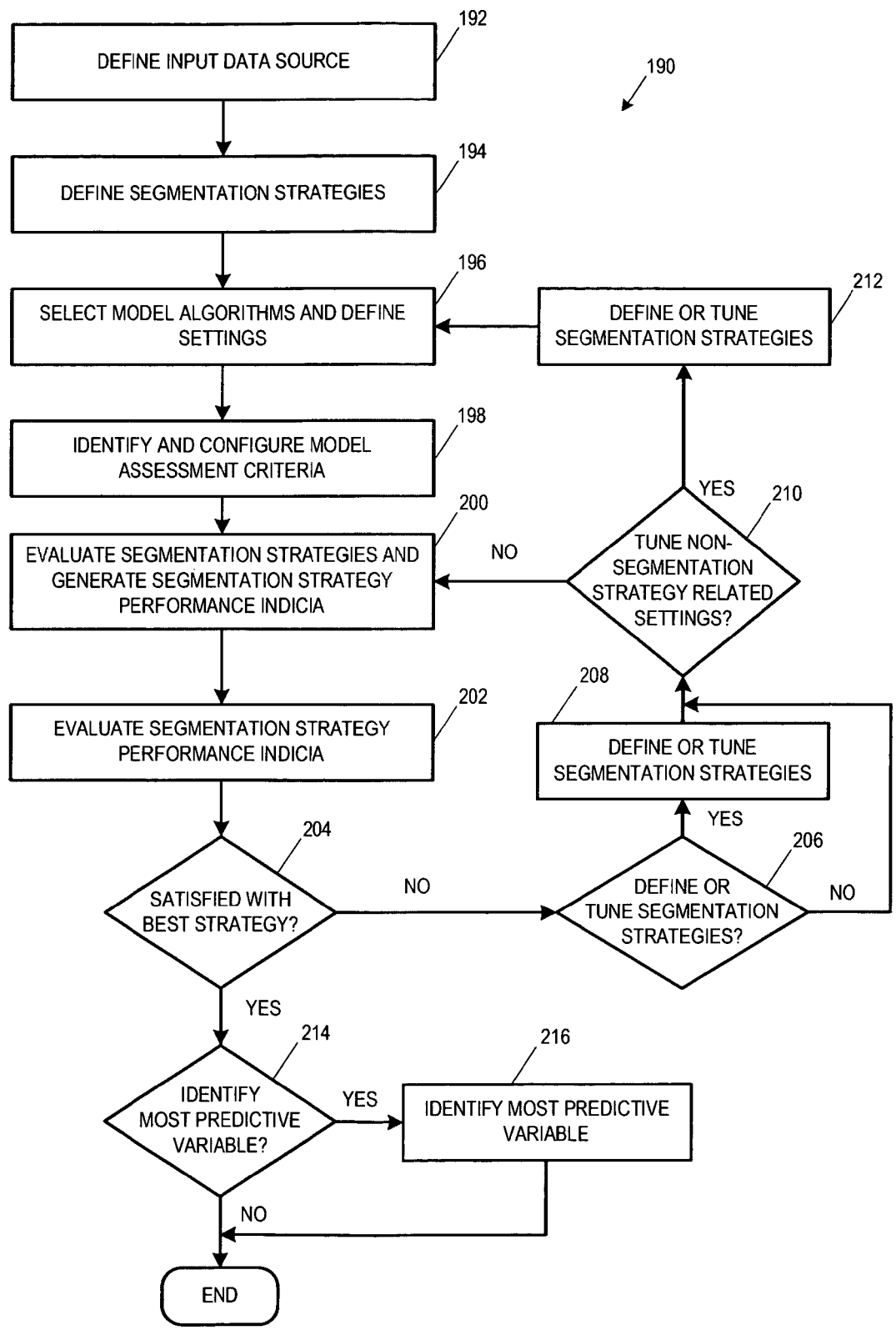
FIG. 8 is a flow diagram of another embodiment of the process for assessing segmentation strategies.

FIG. 8 is a flow diagram 190 of another embodiment of the process for assessing segmentation strategies. Step 192 defines an input data source. An example input data source may comprise a customer database having stored customer statistics.

Step 194 defines segmentation strategies. The segmentation strategies may be defined in a similar manner as described with respect to FIGS. 5 and 7 above.

Step 196 selects model algorithms and defines related settings. Related settings may include partitioning of the input data source into training data and test data. The model may be trained on the training data to prevent over-fitting of the model for a segment.

Step 198 identifies and configures model assessment criteria. The model assessment criteria are used to assess segment performance according to a selected model. Example model assessment criteria include a top percentage of lift, a top percentage of profit, total profit, and the like.

Figure 9:
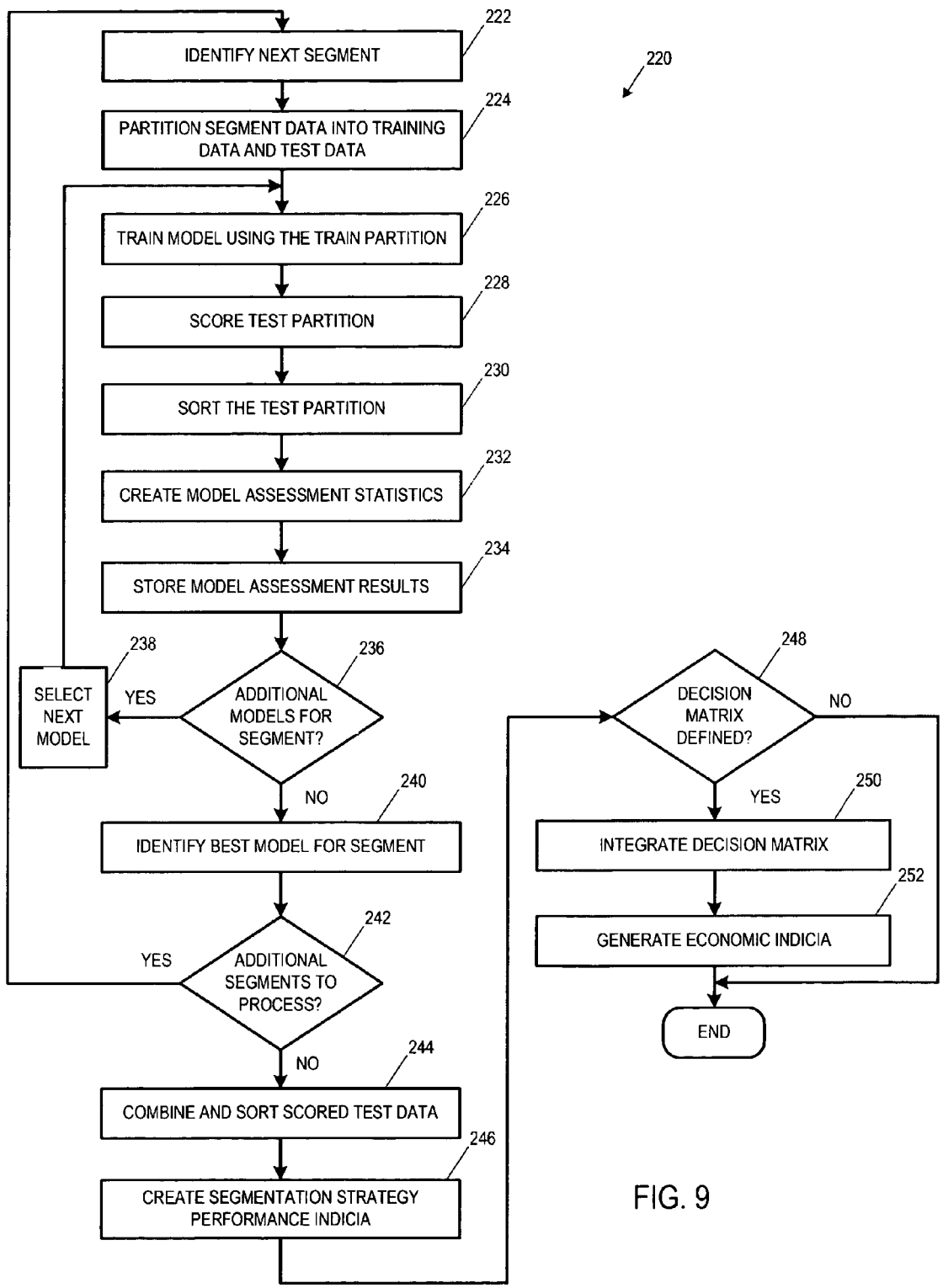
FIG. 9 is a flow diagram of an example process of evaluating segmentation strategies and generating segmentation strategy performance indicia.

Step 200 evaluates segmentation strategies and generates segmentation strategy performance indicia. In one embodiment, step 200 includes aggregating segment performance for each segmentation strategy to obtain aggregate segmentation performance data for each segmentation strategy and generating segmentation strategy performance indicia that compare the aggregate segmentation strategy performance data of at least two of the segmentation strategies. FIG. 9, described below, is another example embodiment for performing step 200.

Step 202 evaluates the segmentation strategy performance indicia. The evaluation may be done automatically based on a segmentation strategy assessment criteria or done manually based on a user inspection. For example, FIG. 16, which is another example graphical data display 360 of segmentation strategy performance indicia, may be inspected by a user to determine which of the segmentation strategy performance indicia 362, 364, 366 is a best performer for a given criterion. Thus, a user may visually inspect the graphical data display 360 to determine that the segmentation strategy relating to indicia 362 is the best performer at 20%, and that the segmentation strategy relating to indicia 364 is the best performer at 60%. Alternatively, a range of best performances can be automatically determined by the segmentation strategy assessment system based on quantitative measurements.

Step 204 determines whether a user is satisfied with the best segmentation strategy. If a user is not satisfied with the best segmentation strategy, e.g., the user determines that the performance of the best performing segmentation strategy is not acceptable, then step 206 determines if new segmentation strategies are to be defined or existing segmentation strategies are to be tuned. If new segmentation strategies are to be defined or existing segmentation strategies are to be tuned, step 208 defines or tunes segmentation strategies. For example, step 208 may generate entirely new segmentation strategies for evaluation, e.g., generate a demographic segmentation strategy if the current set of segmentation strategies does not include a demographic segmentation strategy. Additionally, step 208 may also modify existing segmentation strategies, e.g., creating additional income segments in a segmentation strategy based on income.

Step 210 determines if non-segmentation strategy related settings are to be tuned. If non-strategy related settings are to be tuned, then the process returns to step 196. If non-strategy related settings are not to be tuned, then the process returns to step 200.

Figure 10:
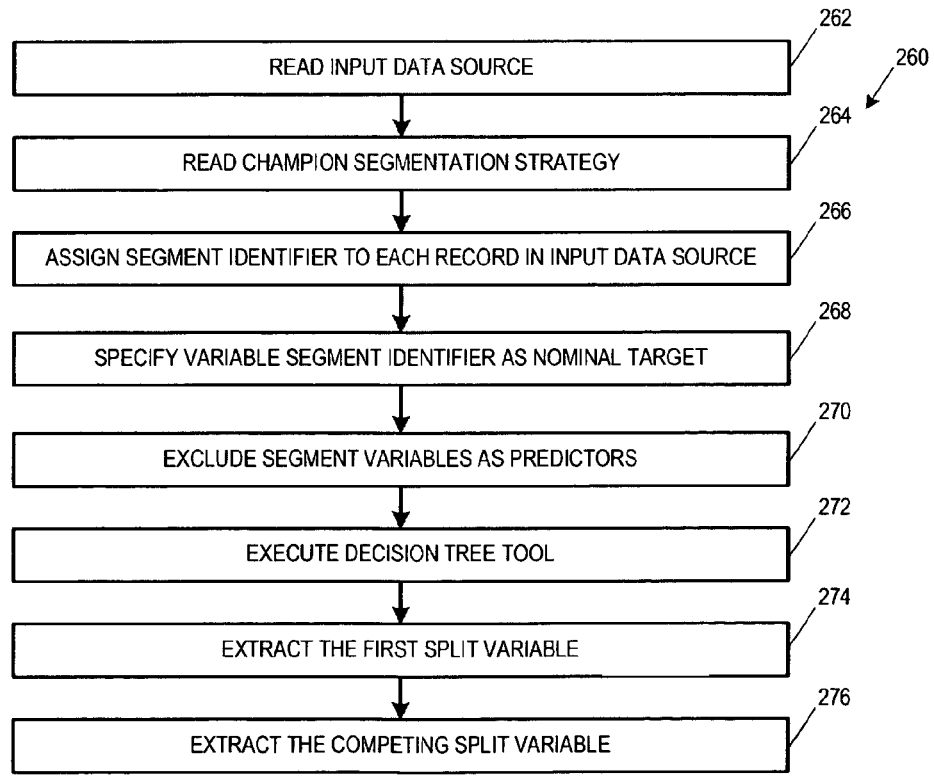
FIG. 10 is a flow diagram of an example process of identifying a most predictive variable.

Once the user is satisfied with a best strategy, step 214 determines if a most predictive variable is to be identified. Identification of a most predictive variable determines which of the variables in the data set is most predictive of a response. If a most predictive variable is to be identified, then step 216 identifies the most predictive variable. FIG. 10, described below, is a flow diagram 260 of an example process of identifying a most predictive variable.

FIG. 9 is the flow diagram 220 of an example process of evaluating segmentation strategies and generating segmentation strategy performance indicia. The example process of FIG. 9 may be used to implement step 200 of FIG. 8. Other implementations, however, may also be used.

Step 222 identifies the next segment for evaluation by a model. In this embodiment, all segments for all segmentation strategies are evaluated.

Step 224 partitions the segment data into training data and test data. The partition may be based on the criteria provided in step 196 of FIG. 8 above. The training data is used to train the model, and the test data is used to test the model for that segment. For example, if a segment includes 100,000 customer data entries, 70,000 customer data entries may be used to train the model, and the remaining 30,000 customer data entries may be used to test the model.

Step 226 trains the model using the train partition and step 228 scores the test partition using the model. After scoring, step 230 sorts the test partition. In one embodiment, scoring and sorting may be based on probability values.

Step 232 creates model assessment statistics. The model assessment statistics are based on the performance of the model over the segment as measured against model assessment criteria, e.g., a top percentage of lift, or a top percentage of profit, and the like.

Step 234 stores the model assessment results for later identification of the best performance of a model over the segment.

Step 236 determines if there are additional models for predicting segment performance. If there are additional models for a segment, then step 238 selects the next model and the process returns to step 226.

If there are no additional models for a segment to model the segment, then step 240 identifies the best model for the segment. The identification is based on the stored model assessment results.

Figures 11, 12:
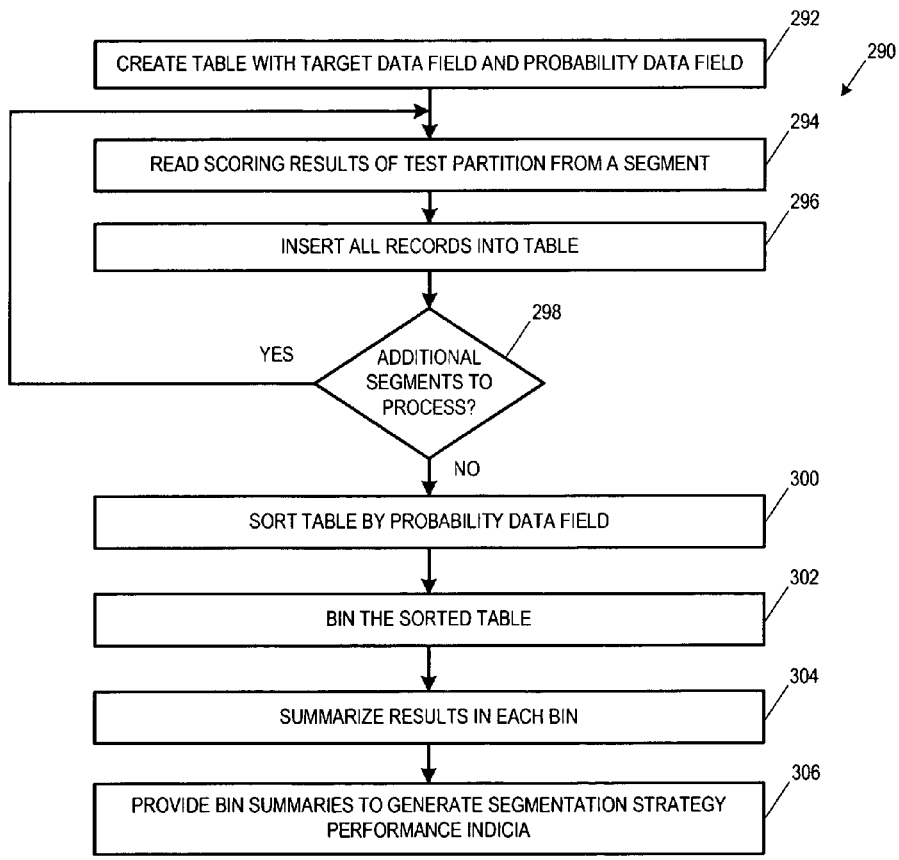
FIG. 11 is a table detailing an example multiple criteria model assessment.
FIG. 12 is a flow diagram of an example process of combining and sorting test data.

Step 242 determines if there are additional segments to process. If there are additional segments to process, then the process returns to step 222. If there are no additional segments to process, then step 244 combines and sorts the scored test data of the best models for the segments. FIG. 12, described below, is a flow diagram 290 of an example process of combining and sorting test data. Step 246 creates segmentation strategy performance indicia based on the combined and stored scored test data.

Step 248 determines if a decision matrix is defined. A decision matrix may be applied to the segmentation strategy performance indicia to provide economic indicia of the comparative performance of the segmentation strategies. For example, while the segmentation strategy performance indicia compares the performance of two or more segmentation strategies, it may not readily reflect economic indicia, such as profit based on each segmentation strategy. Application of a decision matrix can provide such economic indicia.

If a decision matrix is defined, then step 250 integrates the decision matrix with the segmentation strategy performance indicia. FIG. 13, described below, is a flow diagram 310 of an example process of integrating a decision matrix. Step 252 generates the economic indicia based on the integration of the decision matrix. In one embodiment, the economic indicia comprise profit charts based on the segmentation strategy performance indicia.

FIG. 10 is the flow diagram 260 of an example process of identifying a most predictive variable. In the embodiment of FIG. 10, the most predictive variable is determined for the champion segmentation strategy, e.g., the segmentation strategy determined to have the best performance. In another embodiment, the most predictive variable is determined for all of the segmentation strategies represented in the segmentation strategy performance indicia.

Step 262 reads the input data source and step 264 reads the champion segmentation strategy. Step 266 assigns a segment identifier to each record in the input data source. The segment identifier identifies the segment or segments with which the record is associated. Step 268 specifies a variable segment identifier as a nominal target. Step 270 excludes segment variables as predictors, and step 272 executes a decision tree tool. Step 274 extracts the first split variable, and step 276 extracts the competing split variables.

FIG. 11 is a table 280 detailing an example multiple criteria model assessment. Such criteria may be used to identify the best model for a segment. Each model—Model_1, Model_2 and Model_3—is assessed according to model assessment criterion 282 and a corresponding assessment weight 284. The assessment criterion and assessment weight may be selected by a user or may be predetermined. Best models are identified by determining which model performs best for a given criterion 282, and are identified by a score of "1" while the remaining models receive a score of "0." The scores for each model may then be multiplied by the corresponding assessment weights and summed to generate a cumulative weighted score 286. In the example of FIG. 11, Model_1 is scored 2 points, Model_2 is scored 3 points, and Model_3 is scored 1.5 points. Thus, Model_2 performs best for the segment and is designated a champion model for the segment.

FIG. 12 is the flow diagram 290 of an example process of combining and sorting test data. Step 292 creates a table with a target data field and a probability data field, and step 294 reads the scoring result of the test partition data from a segment. Step 296 loads the records into the table created in step 292.

Step 298 then determines if there are additional segments to process. If there are additional segments to process, the process returns to step 294. If there are no additional segments to process, then step 300 sorts the table by the probability data field.

Figure 16:
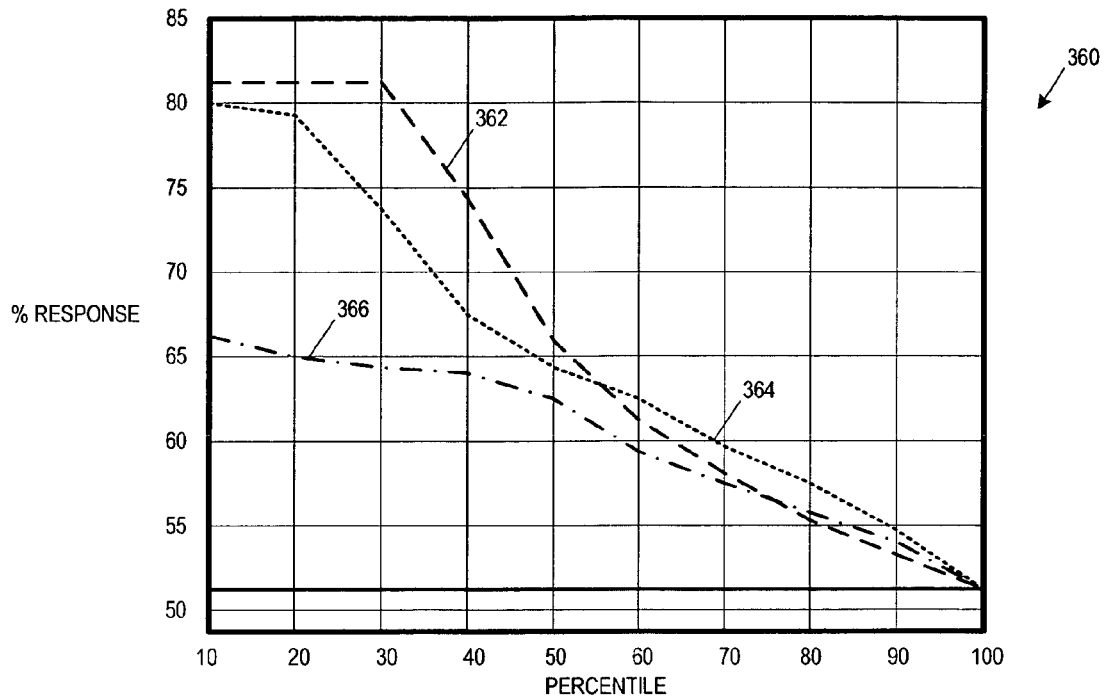
FIG. 16 is another example of a graphical data display of segmentation strategy performance indicia.

Step 302 then bins the sorted data. In one embodiment, that data is binned by assigning the sorted data to deciles, such as shown in FIG. 16. Step 304 summarizes the results of each bin, and step 306 provides the bin summaries to generate segmentation strategy performance indicia, such as shown in FIG. 16.

FIG. 13 is the flow diagram 310 of an example process of integrating a decision matrix. Step 312 reads the decision matrix. The decision matrix comprises data that may be applied to the segmentation strategy performance indicia to provide economic indicia of the comparative performance of the segmentation strategies. In the embodiment of FIG. 13, the economic indicia correspond to profit.

Step 314 reads the scoring results of the test partition, and step 316 creates a table based on the scoring results. Step 318 calculates the expected profit from each record in the table based on the scoring results and the decision matrix. Step 320 sorts the table by expected profit, and step 322 calculates actual profit for each record in the table. Step 324 bins the table by expected profit and step 326 summarizes the actual profit for each bin. Thereafter, step 328 provides summary results for analysis.

FIG. 14 is a table 330 detailing an example multiple criteria, multiple segmentation strategy assessment table. Data generated for and stored in the table 330 may be used to evaluate segmentation strategies against multiple model assessment criterion. Multiple response variables of each segmentation strategy may be used to apply each evaluation against the multiple model assessment criterion to determine which segmentation strategy offers the best performance.

The example table 330 includes model assessment criterion 332, two or more segmentation strategy ranks 334, 336, and 338, and an associated weight for each assessment criterion.

In the embodiment of FIG. 14, segmentation strategies that offer the best performance for a given response variable receive a score of 1; the remaining strategies receive a score of 0. Scores are then multiplied by each corresponding assessment weight 340 and the cumulative values of the multiplied scores are used to generate a cumulative weighted score 342. The cumulative weighted score may be adjusted by scaling to generate an adjusted weighted score 344. In the example embodiment of FIG. 14, the adjusted weighted score is determined by the following scaling formula:

$$A_S = (W_S / \Sigma W_A) * S_1 + S_2$$

where
$A_S$=Adjusted score;
$W_S$=Weighted score;
$\Sigma W_A$=Cumulative value of assessment criterion weights;
$S_1$=First scaling factor (600); and
$S_2$=Second scaling factor (200).

$W_A$, $S_1$ and $S_2$ are each user-configurable. In the example embodiment of FIG. 14, the second segmentation strategy of column 336 offers the best performance over the selected range of response variables and model assessment criteria.

Figure 15:
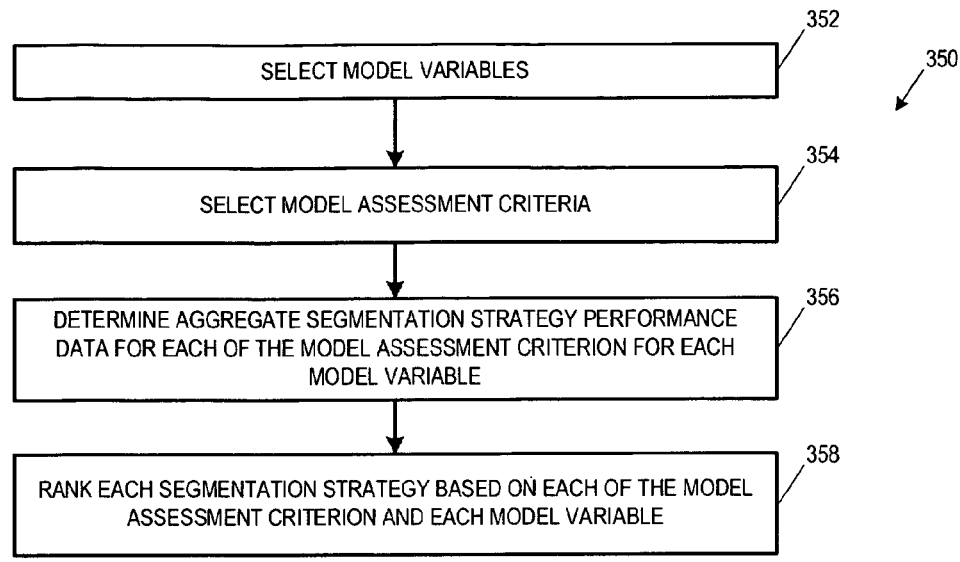
FIG. 15 is a flow diagram of an example process of assessing multiple segmentation strategies by multiple criteria.

FIG. 15 is a flow diagram 350 of an example process of assessing multiple segmentation strategies by multiple criteria. Step 352 selects model variables, and step 354 selects model assessment criteria. Step 356 determines aggregate segmentation strategy performance data for each of the model assessment criteria for each model variable. Step 358 ranks each segmentation strategy based on each of the model assessment criteria and each model variable.

Figure 17:
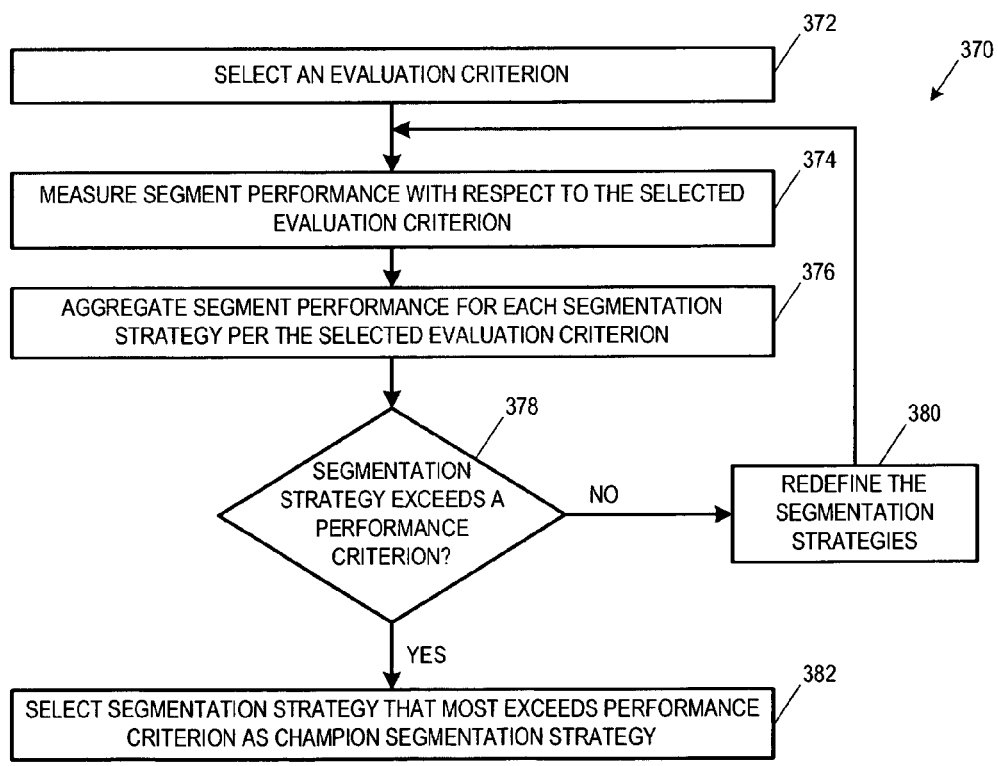
FIG. 17 is a flow diagram of an example process of selecting a champion segmentation strategy.

FIG. 17 is a flow diagram 370 of an example process of selecting a champion segmentation strategy. Step 372 selects an evaluation criterion, and step 374 measures segment performance with respect to the selected evaluation criterion. Step 376 aggregates segment performance for each segmentation strategy per the selected evaluation criterion, and step 378 determines if the segmentation strategy exceeds a performance criterion. If the segmentation strategy does not exceed a performance criterion, then step 380 redefines the segmentation strategy and the process returns to step 374. If the segmentation strategy does exceed a performance criterion, then step 382 selects a segmentation strategy that most exceeds the performance criterion as the champion segmentation strategy.

Figure 18:
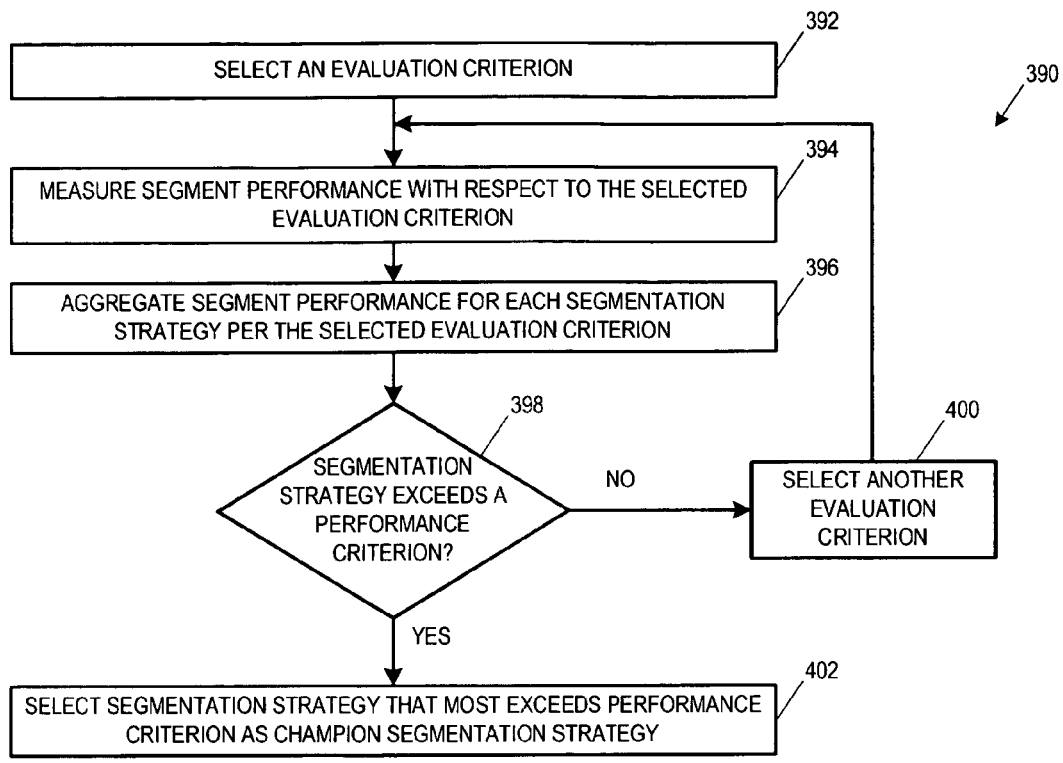
FIG. 18 is a flow diagram of another embodiment of the example process of selecting a champion segmentation strategy.

FIG. 18 is a flow diagram 390 of another embodiment of the example process of selecting a champion segmentation strategy. Step 392 selects an evaluation criterion, and step 394 measures segment performance with respect to the selected evaluation criterion. Step 396 aggregates segment performance for each segmentation strategy per the selected evaluation criterion, and step 398 determines if the segmentation strategy exceeds a performance criterion. If the segmentation strategy does not exceed a performance criterion, then step 400 selects another evaluation criterion. If the segmentation strategy does exceed a performance criterion, then step 402 selects a segmentation strategy that most exceeds the performance criterion as the champion segmentation strategy.

In yet another embodiment, another performance criterion can be selected if a segmentation strategy does not exceed a selected performance criterion.

Figure 19:
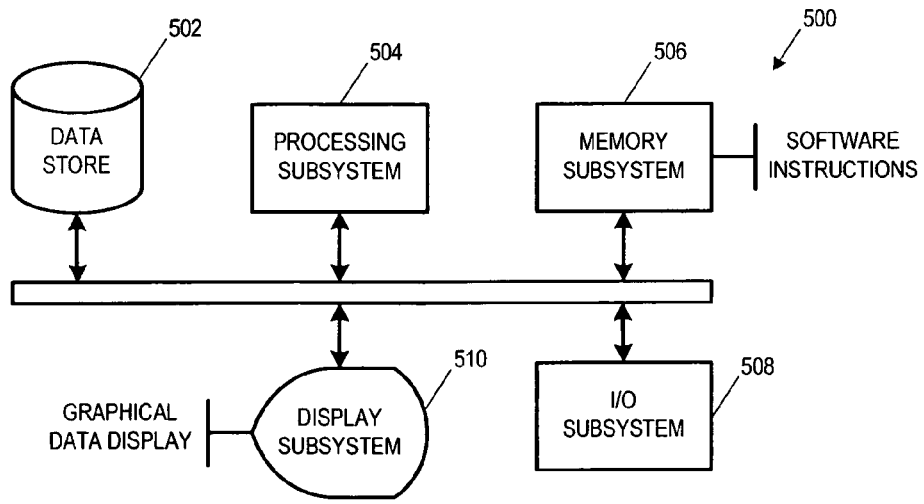
FIG. 19 is a block diagram of a system for assessing segmentation strategies.

FIG. 19 is a block diagram of a system 500 for assessing segmentation strategies. The system includes a data store 502, a processing subsystem 504, a memory subsystem 506, an I/O subsystem 508, and a display subsystem 510. In one embodiment, the system comprises a personal computer. In another embodiment, the system comprises computer devices that are in data communication over a network, such as a local area network (LAN) or wide area network (WAN). The memory subsystem 506 stores software instructions that upon execution cause the processing subsystem 504 to perform the processes described above. The display subsystem 510 may be used to generate graphical data displays of the segmentation strategy performance indicia. Population data may be stored in the data store 502.

The steps and the order of the steps in the methods and flowcharts described herein may be altered, modified and/or augmented and still achieve the desired outcome. Additionally, the methods, flow diagrams and structure block diagrams described herein may be implemented in the example processing devices described herein by program code comprising program instructions that are executable by the device processing subsystem. Other implementations may also be used, however, such as firmware or even appropriately designed hardware configured to carry out the methods and flow diagrams or implement the structure block diagrams described herein. Additionally, the methods, flow diagrams and structure block diagrams that describe particular methods and/or corresponding acts in support of steps and corresponding functions in support of disclosed software structures may also be implemented in software stored in a computer readable medium and equivalents thereof. The software structures may comprise source code, object code, machine code, or any other persistently or temporarily stored code that is operable to cause one or more processing systems to perform the methods described herein or realize the structures described herein.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method for assessing segmentation strategies, comprising:
    defining a plurality of segmentation strategies, wherein a segmentation strategy partitions a population of consumers or clients into a plurality of segments, and wherein a segment groups members of the population according to one or more attributes;
    associating, using one or more data processors, a model with each segment of a segmentation strategy, wherein the associated model is an algorithm that is used to determine a performance score for each segment, the performance score that predicts a consumer or client related activity for a population segment, wherein the consumer or client related activity comprises one or more of a response of the population segment to a marketing activity, loyalty of the population segment to a brand, account acquisitions by the population segment or fraudulent activity by the population segment;
    selecting an evaluation criterion, wherein an associated model uses the evaluation criterion to determine the performance score for a segment;
    aggregating, using the one or more data processors, the performance scores to generate a strategy performance score for each segmentation strategy, wherein aggregating includes sorting and binning data associated with each segmentation strategy;
    selecting a segmentation strategy performance criterion comprising one or more of lift over a baseline or lift relative to an existing segmentation strategy;
    determining, using the one or more data processors, whether one or more of the segmentation strategies exceeds a performance criterion based on the strategy performance scores;
    based on a determination that none of the segmentation strategies exceed the performance criterion, performing one or more of:
        redefining the plurality of segmentation strategies; or
        selecting an alternate evaluation criterion for use by the associated model in determining the performance score for each segment of the population;
    comparing, using the one or more data processors, the strategy performance scores, wherein comparing includes determining a best strategy performance score representing the segmentation strategy predicted to produce a best overall response from the population; and
    displaying a result of the comparison.

2. The method of claim 1, further comprising:
    evaluating the plurality of segmentation strategies using a decision matrix.

3. The method of claim 1, wherein the associated model for each segment is a champion model for that segment.

4. The method of claim 1, further comprising:
    generating a chart of the strategy performance scores for at least two of the segmentation strategies.

5. The method of claim 1, further comprising:
    generating a table of the strategy performance scores for at least two of the segmentation strategies.

6. The method of claim 1, further comprising:
    determining a best segmentation strategy by generating a cumulative rank for each segmentation strategy based on the strategy performance score for that segmentation strategy.

7. A system for assessing segmentation strategies, comprising:
    one or more processors;
    one or more computer readable storage mediums containing instructions configured to cause the one or more processors to perform operations including:
        defining a plurality of segmentation strategies, wherein a segmentation strategy partitions a population of consumers or clients into a plurality of segments, and wherein a segment groups members of the population according to one or more attributes;
        associating a model with each segment of a segmentation strategy, wherein the associated model is an algorithm that is used to determine a performance score for each segment, the performance score that predicts a consumer or client related activity for a population segment, wherein the consumer or client related activity comprises one or more of a response of the population segment to a marketing activity, loyalty of the population segment to a brand, account acquisitions by the population segment or fraudulent activity by the population segment;
        selecting an evaluation criterion, wherein an associated model uses the evaluation criterion to determine the performance score for a segment;
        aggregating the performance scores to generate a strategy performance score for each segmentation strategy, wherein aggregating includes sorting and binning data associated with each segmentation strategy;
        selecting a segmentation strategy performance criterion comprising one or more of lift over a baseline or lift relative to an existing segmentation strategy;
        determining whether one or more of the segmentation strategies exceeds a performance criterion based on the strategy performance scores;
        based on a determination that none of the segmentation strategies exceed the performance criterion, performing one or more of:

redefining the plurality of segmentation strategies; or selecting an alternate evaluation criterion for use by the associated model in determining the performance score for each segment of the population;

comparing the strategy performance scores, wherein comparing includes determining a best strategy performance score representing the segmentation strategy predicted to produce a best overall response from the population; and displaying a result of the comparison.

8. The system of claim 7, wherein the operations further comprise:

evaluating the plurality of segmentation strategies using a decision matrix.

9. The system of claim 7, wherein the associated model for each segment is a champion model for that segment.

10. The system of claim 7, wherein the operations further comprise:

generating a chart of the strategy performance scores of at least two of the segmentation strategies.

11. The system of claim 7, wherein the operations further comprise:

generating a table of the strategy performance scores of at least two of the segmentation strategies.

12. A computer program product for assessing segmentation strategies, tangibly embodied in a machine readable storage medium, including instructions configured to cause a data processing apparatus to:

define a plurality of segmentation strategies, wherein a segmentation strategy partitions a population of consumers or clients into a plurality of segments, and wherein a segment groups members of the population according to one or more attributes;

associate a model with each segment of a segmentation strategy, wherein the associated model is an algorithm that is used to determine a performance score for each segment, the performance score that predicts a consumer or client related activity for a population segment, wherein the consumer or client related activity comprises one or more of a response of the population segment to a marketing activity, loyalty of the population segment to a brand, account acquisitions by the population segment or fraudulent activity by the population segment;

select an evaluation criterion, wherein an associated model uses the evaluation criterion to determine the performance score for a segment;

aggregate the performance scores to generate a strategy performance score for each segmentation strategy, wherein aggregating includes sorting and binning data associated with each segmentation strategy;

selecting a segmentation strategy performance criterion comprising one or more of lift over a baseline or lift relative to an existing segmentation strategy;

determine whether one or more of the segmentation strategies exceeds a performance criterion based on the strategy performance scores;

based on a determination that none of the segmentation strategies exceed the performance criterion, performing one or more of:

redefine the plurality of segmentation strategies; or select an alternate evaluation criterion for use by the associated model in determining the performance score for each segment of the population;

compare the strategy performance scores, wherein comparing includes determining a best strategy performance score representing the segmentation strategy predicted to produce a best overall response from the population; and display a result of the comparison.

* * * * *